US008667514B2

(12) United States Patent
Rastogi et al.

(10) Patent No.: US 8,667,514 B2
(45) Date of Patent: *Mar. 4, 2014

(54) CLIENT APPLICATION INDEPENDENT EXTENSIBILITY MODEL

(75) Inventors: Aditya Rastogi, Kirkland, WA (US);
Alaks Sevugan, Issaquah, WA (US);
Ciprian Gociman, Woodinville, WA (US); Jennifer M. Lin, Seattle, WA (US); Jinbo Zhou, Redmond, WA (US);
Sameer V. Bhangar, Seattle, WA (US);
David Tyler Hunt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,483

(22) Filed: Jan. 9, 2012

(65) Prior Publication Data
US 2012/0110598 A1  May 3, 2012

Related U.S. Application Data

(63) Continuation of application No. 12/465,812, filed on May 14, 2009, now Pat. No. 8,117,622.

(51) Int. Cl.
*G06F 3/00* (2006.01)
(52) U.S. Cl.
USPC .......................................... 719/328; 719/330
(58) Field of Classification Search
USPC .................................................. 719/328, 330
See application file for complete search history.

(56) References Cited

U.S. PATENT DOCUMENTS

| | | | |
|---|---|---|---|
| 5,423,042 A | 6/1995 | Jalili et al. | |
| 5,526,523 A | 6/1996 | Straub | |
| 6,070,168 A * | 5/2000 | Jacuzio | 1/1 |
| 6,823,376 B1 | 11/2004 | George et al. | |
| 6,825,941 B1 * | 11/2004 | Nguyen et al. | 358/1.15 |
| 6,839,892 B2 | 1/2005 | Dawkins | |
| 6,871,345 B1 * | 3/2005 | Crow et al. | 717/175 |
| 7,174,369 B1 * | 2/2007 | Allmark et al. | 709/219 |
| 7,243,336 B2 | 7/2007 | Brockway | |
| 7,386,860 B2 | 6/2008 | Dani | |
| 7,886,285 B2 * | 2/2011 | Asselin et al. | 717/163 |
| 8,117,622 B2 | 2/2012 | Rastogi et al. | |
| 2003/0206192 A1 * | 11/2003 | Chen et al. | 345/733 |
| 2005/0044089 A1 | 2/2005 | Wu | |
| 2005/0246718 A1 | 11/2005 | Erlingsson | |
| 2006/0230396 A1 | 10/2006 | Martinez | |

(Continued)

OTHER PUBLICATIONS

J. Laganier, Host Identify Protocol ( HIP) Registration Extension, Apr. 2008.*

(Continued)

*Primary Examiner* — Lechi Truong
(74) *Attorney, Agent, or Firm* — Anthony Azure; Andrew Sanders; Micky Minhas

(57) ABSTRACT

Information describing a type registration regarding which an action is being requested by the client application is received as one or more parameters of an application programming interface method invoked by the client application. Based on the one or more parameters, one of multiple type extensions to which the action being requested corresponds is determined. At least part of the information describing the type registration is sent to the one of the multiple type extensions, and the one of the multiple type extensions performs the action being requested.

20 Claims, 5 Drawing Sheets

(56) References Cited

U.S. PATENT DOCUMENTS

| | | | |
|---|---|---|---|
| 2007/0282801 A1* | 12/2007 | Apte et al. | 707/3 |
| 2010/0293554 A1 | 11/2010 | Rastogi | |
| 2011/0119358 A1 | 5/2011 | Woodward | |

OTHER PUBLICATIONS

"Notice of Allowance", U.S. Appl. No. 12/465,812, (Dec. 13, 2011), 10 pages.

"Working with Runtime and Operating System Information", Retrieved from <http://livedocs.adobe.com/flex/3/html/help.html?content=runtime_os_info_1.html>, (Mar. 19, 2009), 3 pages.

Bershad, et al., "Extensibility, Safety and Performance in the SPIN Operating System", Retrieved from <http://eprints.kfupm.edu.sa/40185/1/40185.pdf>, (Dec. 1995), 17 pages.

Ghormley et al., "SLIC: An Extensibility System for Commodity Operating Systems", Retrieved from <usenix.org/publications/library/proceedings/usenix98/full_papers/cho/ghormley/ghormley.pdf>, (Jun. 1998), p. 15.

King, et al., "Operating System Extensions to Support Host Based Virtual Machines", Retrieved from <eecs.umich.edu/techreports/cse/02/CSE-TR-465-02.pdf>, (2003), pp. 1-14.

Shaikhali, Ali et al., "UDDIe: An Extended Registry for Web Services", In Proceedings of Applications and the Internet Workshops, 2003, (Jan. 2003), 5 pages.

Sukanen, Jari "Extension Framework for Symbian OS Applications", Retrieved from <tml.tkk.fi/Publications/Thesis/sukanen.pdf>, (Jan. 21, 2004), 80 pages.

* cited by examiner

CLIENT APPLICATION INDEPENDENT EXTENSIBILITY MODEL

RELATED APPLICATIONS

This application is a continuation of U.S. patent application Ser. No. 12/465,812, now U.S. Pat. No. 8,117,622, filed May 14, 2009, entitled "Client Application Independent Extensibility Model" to Aditya Rastogi et al., which is hereby incorporated by reference herein.

BACKGROUND

Many computer operating systems are extensible, allowing additional applications to be installed to extend the functionality provided by the computer through the operating system. While such extensibility can make additional functionality available to users, it is not without its problems. Different applications can install and uninstall extensions on computers in different ways, resulting in the additions and removals of extensions that are performed in inconsistent manners. Furthermore, when applications are uninstalled, the different ways in which extensions can be removed can result in the computer operating system being left in inconsistent states. These different manners in which extensions can be added and removed can thus result in inconsistent computer operating system states and provide inconsistent user experiences, which degrade the user experience with the computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, information describing a type registration regarding which an action is being requested by a client application is received as one or more parameters of an application programming interface method invoked by the client application. Based on the one or more parameters, one of multiple type extensions to which the action being requested corresponds is determined At least part of the information describing the type registration is sent to the one of the multiple type extensions for the one of the multiple type extensions to perform the action being requested.

In accordance with one or more aspects, a type extension receives, from a type extension interface, a registration payload identifying a type registration for an action being requested by a client application. The type extension interface obtained the registration payload via the client application invoking an application programming interface method of the type extension interface. The type extension performs the requested action based at least in part on a store associated with the type extension.

BRIEF DESCRIPTION OF THE DRAWINGS

The same numbers are used throughout the drawings to reference like features.

DETAILED DESCRIPTION

A client application independent extensibility model is discussed herein. A type extension interface operates as an interface between a client application and one or more type extensions. During operation, the client application can perform various actions on type registrations for a registration store corresponding to a type extension, including additions and removals of type registrations. The client application requests an action be performed on a type registration by invoking an application programming interface (API) method of the type extension interface. The type extension interface, in turn, communicates with the appropriate type extension to carry out the requested action. The client application can also provide a callback object to allow communication between the client application and the type extension, via the type extension interface, regarding the requested action.

Figure 1:
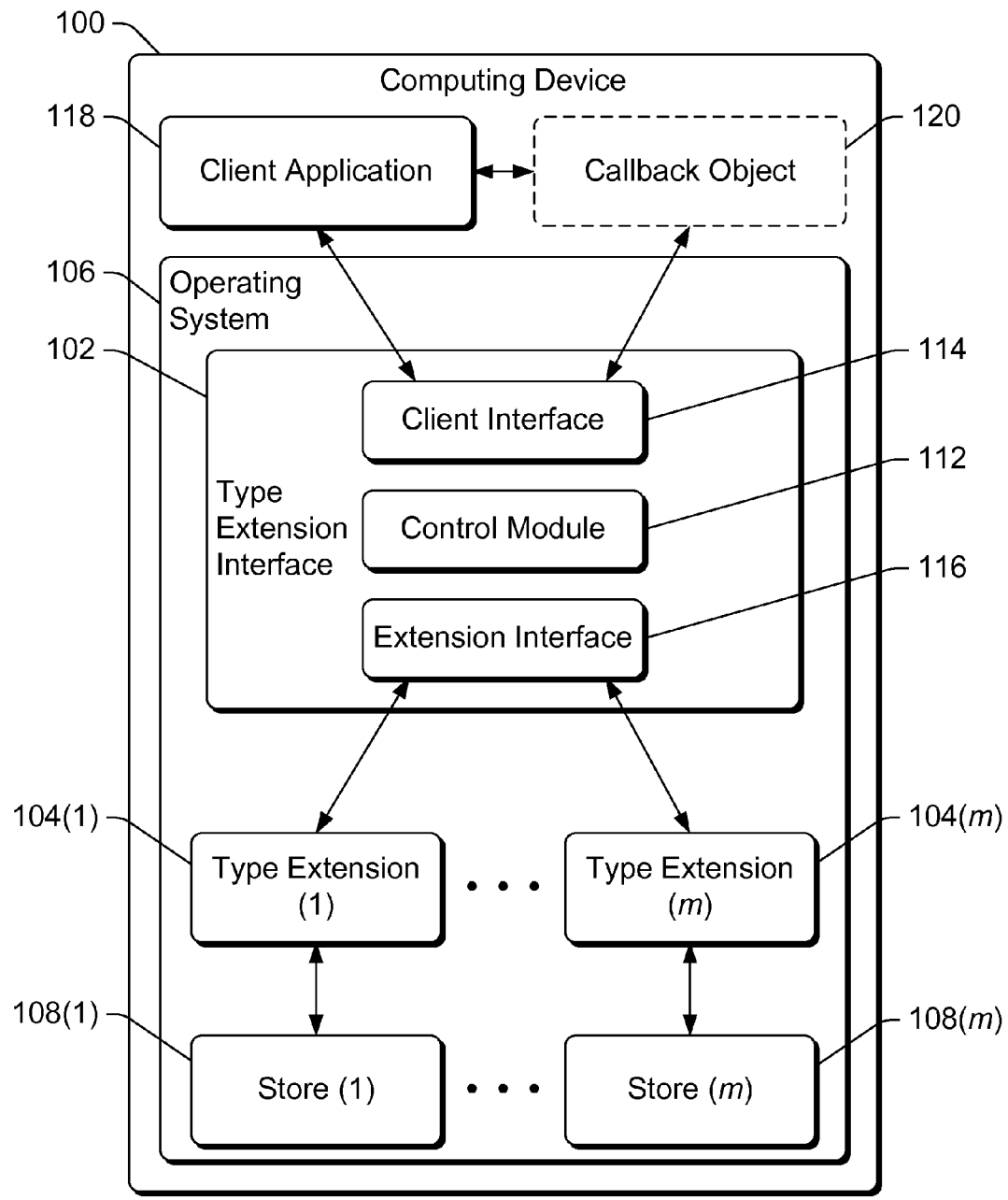
FIG. 1 is a block diagram illustrating an example computing device implementing a client application independent extensibility model in accordance with one or more embodiments.

FIG. 1 is a block diagram illustrating an example computing device 100 implementing a client application independent extensibility model in accordance with one or more embodiments. Computing device 100 can be a variety of different devices capable of running applications. For example, computing device 100 can be a desktop computer, a server computer, a mobile station, an entertainment appliance, a set-top box communicatively coupled to a display device, a television, a wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes a type extension interface 102 and multiple (m) type extensions 104(1 . . . m). Although multiple type extensions 104 are illustrated in FIG. 1, it is to be appreciated that computing device 100 can alternatively implement a single type extension 104. Type extension interface 102 and type extensions 104 are typically implemented as a module or component of an operating system 106 of computing device 100, although alternatively interface 102 and/or one or more extensions 104 can be implemented separately from operating system 106.

Each type extension 104 is a module or component that provides a point of extensibility for computing device 100, typically providing a point of extensibility for operating system 106. Each type extension 104 can extend the functionality of operating system 106 in a variety of different manners, performing various requested actions on registrations in a corresponding store. For example, a type extension 104 can extend file associations, allowing a particular file extension (e.g., a file ending in ".mp3", ".jpg", ".txt", and so forth) to be associated with a different default application so that the default application is run when a user requests to access a file having that particular file extension. By way of another example, a type extension can extend a Class ID (CLSID) to be associated with different Program IDs (ProgIDs). The functionality of operating system can also be extended in a variety of other manners using type extensions 104, such as establishing firewall rules, establishing error tracking and/or reporting rules, and so forth.

Each type extension 104 has an associated or corresponding store 108 in which type registrations are stored. Each type extension 104 can have a dedicated store 108 that is used by only that type extension 104, or alternatively a single store 108 can be used by multiple type extensions 104 and/or other programs or modules. For example, one or more type extensions 104 may use a registry or registration store of operating system 106 as its associated store 108. Each store can be implemented using a variety of different storage media, such as random access memory (RAM), Flash memory, a magnetic disk, an optical disc, and so forth.

Each type registration maintained in a store 108 describes a particular extension of the functionality of operating system 106. The specific nature of each extension included in a type registration can vary based on the associated type extension 104. For example, a particular type registration can identify a file association, can identify a firewall rule, can identify an error tracking and/or reporting rule, and so forth.

Type extension interface 102 includes a control module 112, a client interface 114, and an extension interface 116. A client application 118 running on computing device 100 can communicate requests indirectly to type extensions 104 via type extension interface 102. Client application 118 is typically an installer application configured to install one or more applications (not shown) on computing device 100 and/or uninstall one or more other applications (not shown) on computing device 100. Alternatively, client application 118 can be other types of applications.

Client interface 114 exposes an application programming interface (API) having one or more methods that can be invoked by client application 118 to request one or more actions be taken regarding a type registration. Control module 112 analyzes requests received from client application 118, determines the appropriate type extension 104 to which the request is to be sent, and sends the request to the appropriate type extension 104 via extension interface 116. Client application 118 can also provide callback object 120 to client interface 114. Type extensions 104 and client application 118 can communicate information to one another via type extension interface 102 and callback object 120.

Client interface 114 exposes an API with one or more methods that can be invoked by client application 118. One API method exposed by client interface 114 allows client application 118 to pass to type extension interface 102 one or more parameters requesting that an action be taken regarding a type registration. In one or more embodiments, these one or more parameters include a type extension identity parameter, an action parameter, and a registration payload parameter. Alternatively, one or more of the type extension identity parameter, action parameter, and registration payload parameter can be combined into one parameter, or alternatively separated into multiple parameters.

The type extension identity parameter is a value that is an identifier of a type extension 104. The type extension identifier allows client application 118 to specify a particular one of type extensions 104 to which the request corresponds. The type extension identifier allows the different type extensions 104 to be distinguished from one another by client application 118 as well as type extension interface 102. The type extension identifier can be a Globally Unique ID (GUID), or alternatively another identifier that allows the different type extensions to be distinguished from one another.

The action parameter is a value that is an identifier of a type of action being requested by client application 118 with the request. Various different actions can be supported by type extension interface 102, such as one or more of an install action, an uninstall action, a patch action, a query version action, and a query registration action. It is to be appreciated that these different actions are examples, and that alternatively other actions can be supported by type extension interface 102, and/or one or more of these actions may not be supported by type extension interface 102. The registration payload parameter includes the data for the request. The data for the request can vary based on the desires of client application 118 and the particular action being requested, as discussed in more detail below. In one or more embodiments the data for the request is in an eXtensible Markup Language (XML) format, although other formats can alternatively be used.

The install action indicates that a new type registration is to be added to a store 108. New type registrations are typically added when client application 118 is installing an application on computing device 100, although new type registrations can alternatively be added at other times. The registration payload for an install action identifies the particular registration that is to be added to a store 108. For example, if the new type registration were to be a new file association, then the registration payload would include the new file association being registered.

When client interface 114 receives a request that includes an install action, control module 112 identifies the type extension 104 to which the request corresponds based on the type extension identifier in the request. Control module 112 then passes the request, including an indication of the install action and the registration payload, to the corresponding type extension 104. In one or more embodiments, each type extension 104 implements an API that is similar to that implemented by client interface 114. Alternatively, the interface exposed by each type extension 104 can be exposed in different manners, and can be implemented differently than the API that is implemented by client interface 114.

The type extension 104 corresponding to the request receives the install action and the registration payload from type extension interface 116. In response to the request, type extension 104 generates a rollback payload that identifies a state of at least part of the store 108 corresponding to the type extension 104 before the requested action is performed. This state is typically the state of at least part of the store at the time the request is received by the type extension 104. The rollback payload can be the state of the entire store 108, or alternatively only a portion of the store 108. Whether the entire store 108 or only a portion of the store 108 is included in the rollback payload can be determined in different manners, such as being pre-programmed into type extension 104, being a configuration setting of type extension 104, being based on the received registration payload, and so forth. Additionally, it is to be appreciated that valid states of the store 108 can be captured for the rollback payload, but any non-valid states need not be captured.

In one or more embodiments, for the rollback payload type extension 104 determines the current state of a type registration when a request to install a new type registration is received. This current state refers to the type registration and settings or values stored as part of that type registration in the store 108 corresponding to the type extension 104. For example, if a request to install a new file association is received, type extension 104 determines the current state (if any) of the file association (e.g., the default application for handling files with the file extension identified in the registration payload) and stores that current state in the rollback payload. By way of another example, if a request to install a new firewall rule is received, type extension 104 determines the current state (if any) of that firewall rule and stores that current state in the rollback payload.

Type extension 104 returns the rollback payload to extension interface 116. The rollback payload (or an identifier of the rollback payload) can be returned to interface 116 as a response value in response to an API method that was invoked to pass the action and registration payload to type extension 104. Alternatively, the rollback payload (or an identifier of the rollback payload) can be returned to interface 116 by invoking an API method exposed by extension interface 116, or alternatively in other manners.

Control module 112 then returns the rollback payload to client application 118 via client interface 114. The rollback payload (or an identifier of the rollback payload) can be returned to client application 118 as a response value in response to the API method that was invoked by client application 118 to pass the request to type extension interface 102. Alternatively, the rollback payload (or an identifier of the rollback payload) can be returned to client application 118 by invoking an API method exposed by client application 118, via callback object 120, or alternatively in other manners.

The rollback payload provides client application 118 with the state of the type registration (and optionally additional portions of the store 108 in which the type registration is stored, as discussed above) before the requested type registration is added to the store. Accordingly, if client application 118 terminates the process of installing an application, client application 118 can rollback or "undo" the portions of the installation process that were already performed. This rolling back includes requesting that type extension interface 102 uninstall type registrations that were installed by client application 118 via install requests.

In addition to generating the rollback payload, type extension 104 performs the requested installation of the type registration in the registration payload by adding the type registration to the store 108 corresponding to the type extension. The specific manner in which the type registration is added to the store 108 can vary based on various criteria, such as the manner in which type extension 104 is implemented, the manner in which the store 108 corresponding to the type extension 104 is implemented, and so forth. For example, the registration can be performed by type extension 104 writing one or more values to an operating system registry, by type extension 104 invoking a method of an API of a registration store, and so forth.

In one or more embodiments, type extension 104 also performs additional actions to record information about the new type registration being added to the store 108 and/or the previous state of the type registration in the store 108. It is to be appreciated that some type extensions 104 can record this additional information but that other type extensions 104 do not record this additional information. When recorded, this additional information can be recorded in the corresponding store 108, in a different store 108, in an additional local or remote store (not shown), and so forth. This additional recorded information can include a variety of different information, such as an identifier of client application 118 or the application being installed by client application 118 (e.g., as part of the registration payload), a date and/or time of the new type registration (e.g., when the installation request was received from client application 118, when the type was stored in store 108, etc.), and so forth.

This additional recorded information is maintained for each new type registration, even though new type registrations may be added to store 108 to replace previous type registrations. For example, a first type registration associating a particular file extension with a first default application to be run when a user requests access to a file having that particular file extension can be stored in store 108. The first type registration as well as an indication of a date and time when the first type registration was added to store 108 is maintained in the additional recorded information. A second type registration can then be stored in store 108, replacing the first type registration with the second type registration that associates that particular file extension with a second default application. The second type registration as well as an indication of a date and time when the second type registration was added to store 108 is maintained in the additional recorded information. A third type registration can then be stored in store 108, replacing the second type registration with a third type registration that associates that particular file extension with a third default application. The third type registration as well as an indication of a date and time when the third file type registration was added to store 108 is maintained in the additional recorded information.

This additional recorded information allows type extensions 104 to operate in a more consistent and predictable manner in situations where an application is uninstalled. Following the previous example, assume that the third application were to be uninstalled. The type extension 104 can access this additional recorded information and readily identify that, prior to the third type registration, the second type registration was the most recent type registration for that particular file extension. Type extension 104 can then add the second type registration to store 108. Type extension 104 can also communicate with another component or module of operating system 106 to determine if the second application identified by the second type registration has already been uninstalled. If the second application has already been uninstalled, then type extension 104 can readily identify that, prior to the second type registration, the first type registration was the most recent type registration for that particular file extension. Type extension 104 can then add the first type registration to store 108.

An additional action that can be requested by client application 118 is an uninstall action. The uninstall action indicates that a type registration is to be removed from a store 108. Type registrations are typically removed when client application 118 is uninstalling an application from computing device 100, although type registrations can alternatively be removed at other times. The registration payload for an uninstall action identifies the particular type registration that is to be removed from a store 108. For example, if the type registration were to be a file association, then the registration payload would include the file association that is to be removed. Alternatively, rather than including the actual type registration, an identifier of the type registration (such as hash value generated by applying a hashing algorithm to the type registration) can be included in the registration payload.

Type extension interface 102 and the type extension 104 corresponding to a request that includes an uninstall action operate similarly to the discussion above regarding a request that includes an install action. The request is received from client application 118, the corresponding type extension 104 is identified, and the request is sent to the corresponding type extension 104. Additionally, a rollback payload is generated and returned to client application 118, allowing client application 118 to request that the store be returned to its previous state if the uninstallation process is terminated. However, for an uninstall action the type extension 104 corresponding to the request removes the type registration identified in the registration payload from the store 108 rather than adding the type registration identified in the registration payload to the store.

Furthermore, as discussed above additional information regarding the new type registration added to the store 108 and/or the previous state of the type registration in the store 108 can be maintained in response to an install action. When such additional information is maintained and a request that includes an uninstall action is received, the type extension 104 determines, based on the recorded additional information, a previous state for the type registration being removed from the store 108. Type extension 104 then stores this previous state in store 108.

In one or more embodiments, in identifying the previous state for the type registration, type extension 104 verifies that the previous state is still a valid state for the type registration. The determination of what is a valid state can vary based on the type extension 104 and the particular type registration. For example, if the type registration is a registration associating a particular file extension with a default application, then type extension 104 can communicate with one or more other components or modules of operating system 106 to verify that the default application is still installed on computing device 100. By way of another example, if the type registration is a registration associating a particular Class ID with a particular Program ID, then type extension 104 can communicate with one or more other components or modules of operating system 106 to verify that the application with that particular Program ID is still installed on computing device 100.

An additional action that can be requested by client application 118 is a patch action. The patch action allows a new type registration to be stored that replaces a previous type registration. Accordingly, the patch action can be viewed as being similar to both an install action because the new type registration is added to a store, and an uninstall action because the previous type registration is removed from a store. For a patch action client application 118 is configured with or otherwise obtains both the new type registration that is to be added to a store 108 and a corresponding previous type registration that is to be replaced by the new type registration.

The registration payload corresponding to a patch action includes both the new type registration and the previous type registration. Alternatively, rather than including the actual previous type registration, an identifier of the previous type registration can be included in the registration payload. A variety of different identifiers could be used that allow the previous type registration to be identified, such as a service name for a service registration, a hash value generated by applying a hashing algorithm to the type registration, and so forth. This registration payload is received by type extension interface 102 and forwarded to the appropriate type extension 104 in the same manner as discussed above with reference to the install action. A rollback payload is also returned to client application 118 in the same manner as discussed above with reference to the install action.

In addition, for a patch action type extension 104 also obtains a current state of the previous type registration from store 108. Situations can arise where the previous type registration was changed since being added to store 108, and such changes are not reflected in the previous type registration received from client application 118. For example, a system administrator or user may have set a configuration value associated with the previous type registration, may have enabled or disabled the previous type registration, and so forth. Any such changes that were made are reflected in store 108, even though client application 118 may not be aware of such changes.

It is to be appreciated that, even though the previous type registration in store 108 may have been changed, the changed previous type registration from store 108 can still be identified as being the type registration as the previous type registration received from client application 118. For example, one or more parts of the previous type registration may have changed, but other identifying information remains unchanged (e.g., a name or identifier of the type registration, other parameters or data of the type registration, and so forth).

Type extension 104 compares the previous type registration received from client application 118 to the current state of the previous type registration obtained from store 108, and identifies differences between the two. These differences reflect changes that were made to the previous type registration in store 108. To the extent that such changes correspond to a part of the new type registration (e.g., a configuration value in the new type registration, an enabled/disabled setting of the new type registration, etc.), the new type registration is modified to include such changes. The modified new type registration is then stored in the store 108 corresponding to the type extension 104.

Additionally, in one or more embodiments the registration payload can identify whether particular parts of the new type registration are changeable. For example, the registration payload can specify whether a particular configuration value in the new type registration is changeable, whether an enabled/disabled setting of the new type registration is changeable, and so forth. In such embodiments, type extension 104 modifies the new registration type to include changes that were made to the previous type registration in store 108 only if the registration payload indicates such changes are permitted (e.g., those parts of the new registration type are changeable).

For example, assume that the previous type registration is a firewall rule with a default setting of enabled, and that after the firewall rule was added to the store 108, a user changed the setting of the firewall rule to disabled. Further assume that client application 118 desires to change that firewall rule to a new version of the firewall rule, which is the new type registration. Client application 118 submits a request with a patch action that identifies both the previous type registration (the firewall rule set to enabled) and the new type registration (the new version of the firewall rule set to enabled). Type extension 104 obtains the current state of the previous type registration (which is the firewall rule set to disabled), and changes the setting of the new version of the firewall rule to disabled, thereby preserving the user's changes. Optionally, type extension 104 changes the setting of the new version of the firewall rule to disabled only if the registration payload (or optionally other part of the request) indicates that the disabled/enabled setting of the new type registration is changeable.

The new type registration, as modified by type extension 104, is saved to store 108. Additional information regarding the new type registration added to the store 108 and/or the previous state of the type registration in the store 108 is can also be maintained in an additional record as discussed above with reference to the install action.

It is to be appreciated that both the install action and the uninstall action can be viewed as particular cases of the patch action, and accordingly both the install action and the uninstall action can be implemented using the patch action. The install action is a particular case of the patch action where the previous type registration is a null type registration (the previous type registration can be absent or a "null" identifier can be used for the previous type registration). Accordingly, a patch action from a null type registration (e.g., from no type registration) to a new type registration stores the same new type registration as an install action for the new type registration. As there is no previous type registration, the current state of the previous type registration in the store 108 would be the null state (e.g., no state) so type extension 104 would not modify the new type registration based on the current state of the previous type registration.

Similarly, the uninstall action is a particular case of the patch action where the new type registration is a null type registration (the new type registration can be absent or a "null" identifier can be used for the previous type registration). Accordingly, a patch action from a previous type registration to a null type registration (e.g., to no type registration) results in the previous type registration being removed from store 108. The current state of the previous type registration in the store 108 would not result in any modification of the new type registration because there is no new type registration.

An additional action that can be requested by client application 118 is a query version action. The query version action allows a client application 118 to retrieve a version of a type extension 104. A type extension 104 can be updated and replaced over time, allowing different versions of the type extension 104 to be available at different times on computing device 100. Each type extension 104 is aware of its own version, typically represented as a version number. A request with a query version action is received by type extension interface 102 and sent to the appropriate type extension 104, analogous to the discussions above. In response to the query version action, type extension 104 returns an indication of a version of type extension 104 to control module 112 via extension interface 116, which in turn returns the indication to client application 118 via client interface 114.

An additional action that can be requested by client application 118 is a query registration action. The query registration action allows a client application to retrieve a type registration from store 108. As discussed above, one or more settings of the type registration may have been changed after the type registration was added to store 108, and the query registration action allows client application 118 to retrieve the type registration and identify any such changes. A request with a query registration action is received by type extension interface 102 and sent to the appropriate type extension 104, analogous to the discussions above. The registration payload corresponding to a query registration action includes an identifier of a particular type registration. Type extension 104 retrieves from store 108 the identified type registration, and returns the identified type registration to control module 112 via extension interface 116, which in turn returns the identified type registration to client application 118 via client interface 114.

Although various actions are described, it should be noted that not all actions need be supported by type extension interface 102. In one or more embodiments, a single action (e.g., the patch action) is supported. It is to be appreciated that when a single action is supported, an action parameter need not be provided to client interface 114. Rather, the action is inherent in the API method.

Additionally, client interface 114 is described above as including an action parameter. Alternatively, client interface 114 can implement a different API method for each different action, resulting in the action being inherently identified by the API method invoked. For example, the API could expose a "doInstall" method, a "doUninstall" method, and so forth.

Similarly, the interfaces exposed by type extensions 104 can implement different API methods for each different action, resulting in the action being inherently identified by the API method invoked.

As discussed above, situations can arise where client application 118 desires to rollback a process or operation it is performing. For example, client application 118 could desire to undo or rollback a process of installing another application on device 100, undo or rollback a process of uninstalling another application on device 100, and so forth. In one or more embodiments, when performing such a rollback or undoing, client application 118 informs type extensions 104 via type extension interface 102 that it is performing a rollback or undoing of a process. In one or more embodiments, a "rollback" or "uninstall" flag, hint, or other identifier is included in a request to client interface 114, which can be passed on by type extension interface 102 to the appropriate type extension 104. Alternatively, other techniques can be used, such as separate API methods for rollback or uninstall processes. For example, a "doAction" method can be invoked when client application 118 is not performing a rollback or uninstall process, and a "doActionRollback" method can be invoked when client application 118 is performing a rollback or uninstall process.

As discussed above, in response to a request client application 118 receives a rollback payload identifying a current state of a type registration. Accordingly, client application 118 is aware of the requests it sent to client interface 114, as well as a rollback payload for each of those requests, and thus can readily determine the requests to send to client interface 114 to undo or rollback the process that application 118 was performing.

Type extensions 104 receive an indication from type extension interface 102 of the requests that are associated with a rollback or undo process. Type extensions 104 can then take appropriate measures or steps, such as creating additional backup copies of the state of store 108, removing previously stored information regarding registrations from an additional record of information, and so forth. The particular measures or steps taken by type extensions 104 can vary based on the desires of the designers, developers, users, and/or administrators of type extensions 104.

In one or more embodiments, client interface 114 exposes a doAction method exposed by a COM (Component Object Model) object for type extension interface 102. The doAction method is:

```
HRESULT doAction(
    [in, string] LPCWSTR wszXML,
    [out, string] LPWSTR *pwszOut,
    [in] IUnknown *pReserved
);
```

The doAction method includes an input string "wszXML" which is the input parameters discussed above (the type extension identifier, action, and registration payload), and an output string *pwszOut which is an output string indicating the result of the request and includes parameters that can be input to rollback the action that was done based on the input string "wszXML". For example, the output string can include the type extension identifier, an action (which may or may not be the same as the action in the input parameter), a rollback payload, and a flag, hint, or other identifier indicating "rollback". The doAction method is invoked by client application 118 for each request regarding a type registration. A similar doAction method is exposed by type extensions 104, allowing extension interface 116 to pass the requests to the appropriate type extensions 104 as discussed above.

In one or more embodiments, during operation client application 118 also provides a callback object 120 to type extension interface 102. Callback object 120 allows information regarding the process being performed by client application 118 (e.g., an install process, an uninstall process, etc.) as well as the registration being performed by type extensions 104 to be communicated between client application 118 and type extensions 104. Client application 118 provides callback object 120 to client interface 114. Client application 118 typically provides one callback object 120 when client application begins sending requests to client interface 114, such as including callback object 120 as part of the first request sent to client interface 114. Alternatively, multiple such callback objects 120 can be provided and/or callback objects 120 can be provided at different times.

Extension interface 116 also communicates a reference to callback object 120 to a type extension 104 when a request regarding a type registration is sent to type extension 104. The type extension 104 can then invoke a method exposed by extension interface 116, requesting particular information from client application 118 (or providing particular information to client application 118) and identifying callback object 120. The particular information desired and/or provided by type extension 104 can vary based on the designers, developers, users, and/or administrators of type extension 104. Control module 112, in turn, invokes the appropriate method of callback object 120 to obtain or provide the desired information. Callback object 120 communicates with the appropriate components, objects, and/or modules of client application 118 to obtain or provide the desired information, and returns obtained information to control module 112 via client interface 114. Control module 112 in turn returns the obtained information to the type extension 104 via extension interface 116.

In one or more embodiments, extension interface 116 exposes a report progress method, a log message method, and an is-canceled method to type extensions 104. Analogous methods are exposed by callback object 120 to client interface 114. Accordingly, type extension 104 can invoke one or more of these methods to obtain the information desired by the type extension 104.

The report progress method allows a type extension 104 to report the progress of a request it has received. In one or more embodiments, type extension 104 identifies an estimated completion percentage for the request by specifying two numbers in an "x out of y" format. For example, if there are seven steps that type extension 104 performs in response to a particular request and two of those seven have been completed, type extension 104 can invoke the report progress method with parameters of 2 and 7 to indicate that the request is estimated at 2/7 completed.

The log message method allows a type extension 104 to report various messages to client application 118 regarding the request it has received. A variety of different messages can be reported based on the desires of the designers, developers, users, and/or administrators of type extension 104. Such messages can be informational messages, error messages, and so forth. For example, if a request with an uninstall action is received and includes a type registration in the registration payload that is not present in the store, a message indicating such can be reported by type extension 104 by invoking the log message method. The log message method has, as a parameter, the message being reported by type extension 104.

The is-canceled method allows a type extension 104 to check whether the process being performed by client application 118 has been canceled. In response to the is-canceled method being invoked, client application 118 returns an indication to type extension 104 indicating whether the process being performed by client application 118 has been canceled. Type extension 104 can check whether the process has been canceled at various times, such as prior to performing certain activities, prior to deleting or removing particular data or information, and so forth. This check allows type extension 104 to verify that the process started by client application 118 has not been canceled and thus that type extension 104 is to proceed with its operation. However, if the process started by client application 118 has been canceled, then type extension 104 can halt its operation and wait for rollback and/or undo requests from client application 118.

Thus, it can be seen that type extension interface 102 abstracts the particular type extensions 104 from client application 118, and similarly abstracts the client application 118 from type extensions 104. Type extension interface 102 and type extensions 104 provide a model for extensibility of operating system 106 that is independent of the client application 118 that is installing, uninstalling, or otherwise modifying the extensibility of operating system 106 via type registrations. Client application 118 interacts with type extensions 104 indirectly, via type extension interface 102, allowing various changes to be made to type extensions 104 and corresponding stores 108 without adversely affecting client application 118. This extensibility model thus allows changes and improvements to be made to type extensions 104 and/or stores 108 while allowing the operation of client application 118 to remain unchanged.

Figure 2:
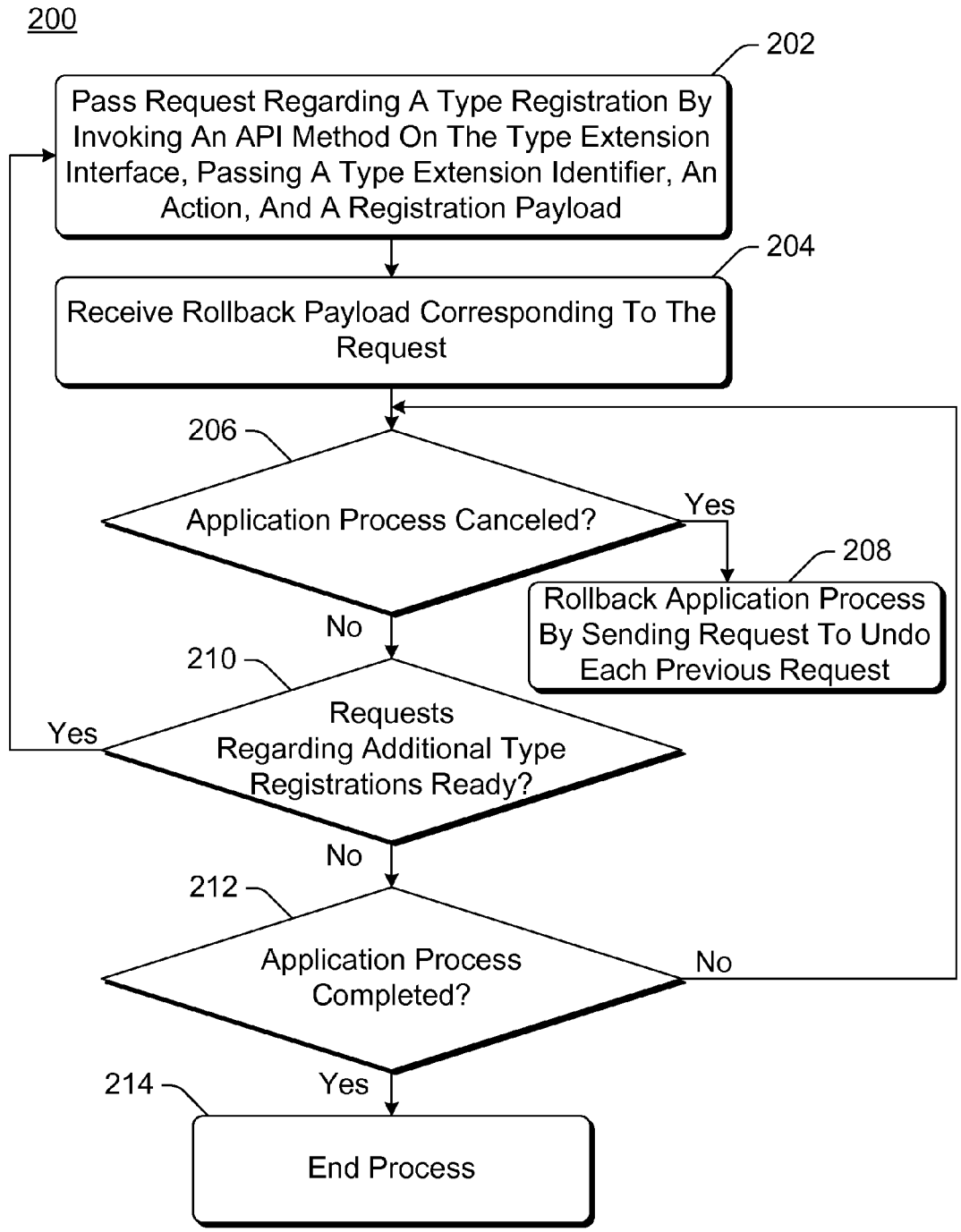
FIG. 2 is a flowchart illustrating an example process for the operation of a client application on a device in accordance with one or more embodiments.

FIG. 2 is a flowchart illustrating an example process 200 for the operation of a client application on a device in accordance with one or more embodiments. Process 200 is carried out by a client application of a device, such as client application 118 of FIG. 1, and can be implemented in software, firmware, hardware, or combinations thereof. Process 200 is an example process for the operation of a client application on a device; additional discussions of the operation of a client application on a device are included herein with reference to different figures.

In process 200, a request regarding a type registration is passed to a type extension interface by invoking an API method on the type extension interface (act 202). This request includes a type extension identifier, an action, a registration payload, and optionally a callback object as discussed above. A variety of different actions can be requested, and the action can be inherent in the API method invoked as discussed above.

In response to the request, a rollback payload corresponding to the request is received (act 204). As discussed above, this rollback payload identifies a state of at least part of a store corresponding to the identified type extension before the requested action is performed, and can optionally include only valid state of the store.

A check is made as to whether the application process being implemented by the client application is canceled (act 206). The application process can be canceled in response to a variety of different situations, such as a user request to cancel the application process, an error being detected in the application process, and so forth.

If the application process is canceled, then the application process is rolled back (act 208). This rollback is accomplished by sending a request to the type extension interface to undo each previous request sent in act 202. For example, for each request with an install action that was sent in act 202, a request to undo that install action is sent in act 208. By way of another example, for each request with a patch action that was sent in act 202, a request to undo that patch action is sent in act 208.

However, if the application process is not canceled then a check is made as to whether there is another request regarding an additional type registration ready to be made (act 210). If the application process being implemented by the client application has a request regarding an additional type registration ready to be made, then the request is passed to the type extension interface (act 202).

However, if the application process being implemented by the client application does not have a request regarding an additional type registration ready to be made, then a check is made as to whether the application process is completed (act 212). If the application process is completed, then the process 200 ends (act 214). However, if the application process is not completed, checks are repeatedly made as to whether the application process is canceled (act 206) and whether there is another request regarding an additional type registration ready to be made (act 210).

Figure 3:
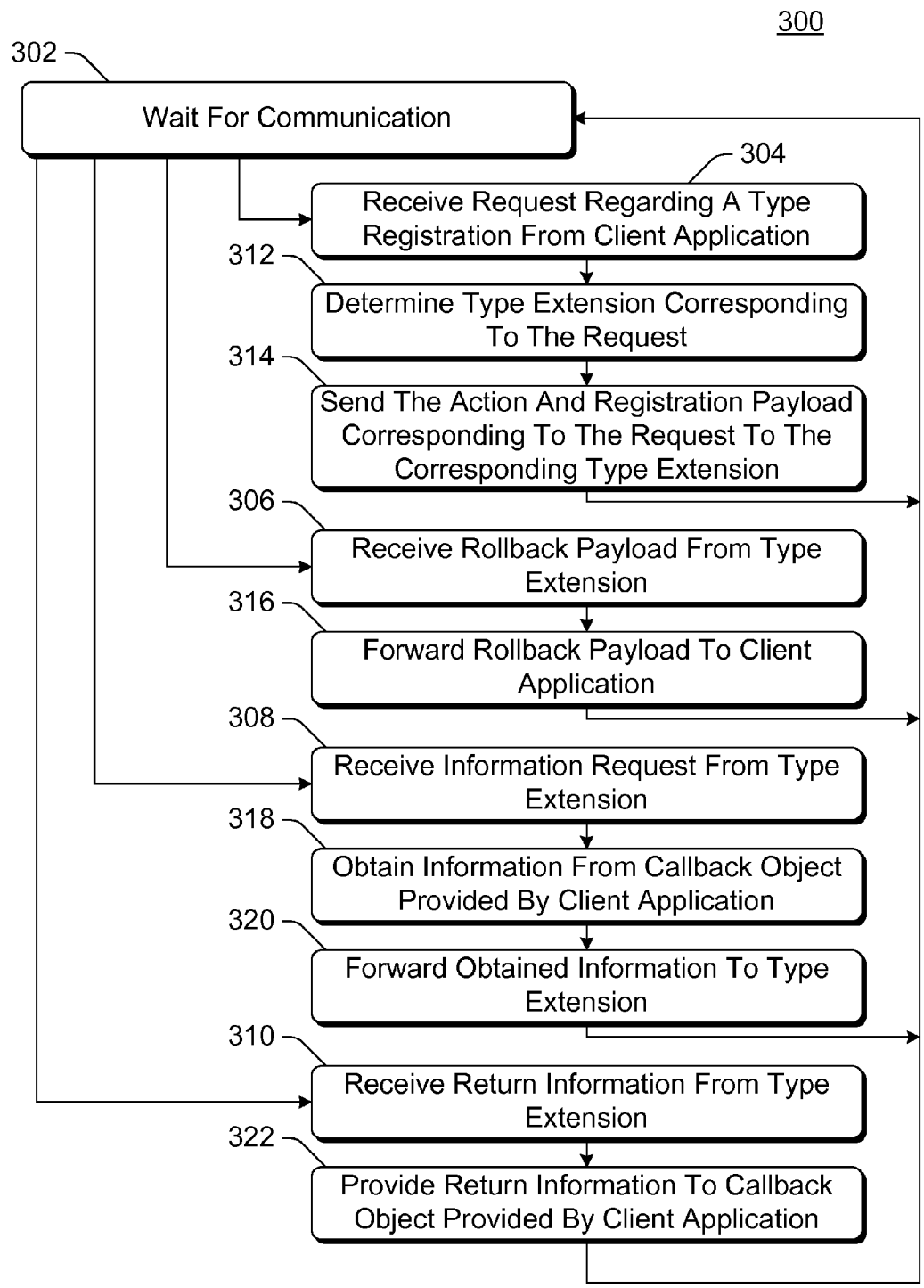
FIG. 3 is a flowchart illustrating an example process for the operation of a type extension interface in accordance with one or more embodiments.

FIG. 3 is a flowchart illustrating an example process 300 for the operation of a type extension interface in accordance with one or more embodiments. Process 300 is carried out by a type extension interface of a device, such as type extension interface 102 of FIG. 1, and can be implemented in software, firmware, hardware, or combinations thereof. Process 300 is an example process for the operation of a type extension interface on a device; additional discussions of the operation of a type extension interface on a device are included herein with reference to different figures.

In process 300, the type extension interface waits for a communication (act 302). Different communications can be received, such as a request from a client application regarding a type registration (act 304), a rollback payload from a type extension (act 306), a request for information received from a type extension (act 308), or return information received from a type extension (act 310).

If a request from a client application regarding a type registration is received (act 304), then a determination of the type extension corresponding to the request is made (act 312). This determination can be made, for example, by obtaining the type extension identifier from the request.

The action and the registration payload corresponding to the request is sent to the corresponding type extension as identified in act 312 (act 314). A variety of different actions and registration payloads can be included in the request, as discussed above. Additionally, the action can be inherent in the API method invoked to make the request, as discussed above. Process 300 then returns to wait for an additional communication (act 302).

If a rollback payload from a type extension is received (act 306), then the received rollback payload is forwarded to the client application (act 316). This rollback payload can be forwarded to the client application in different manners, such as the response to the request regarding the type registration previously received from the client application as discussed above. Process 300 then returns to wait for an additional communication (act 302).

If a request for information is received from a type extension (act 308), then the information requested is obtained from a callback object provided by the client application (act 318). The information obtained from the callback object is provided to the requesting type extension (act 320). Process 300 then returns to wait for an additional communication (act 302).

If return information from a type registration is received (act 308), then the return information is provided to the callback object provided by the client application (act 322). This return information can be, for example, information reporting the progress of a request, a log message regarding a request, and so forth as discussed above. Process 300 then returns to wait for an additional communication (act 302).

Figure 4:
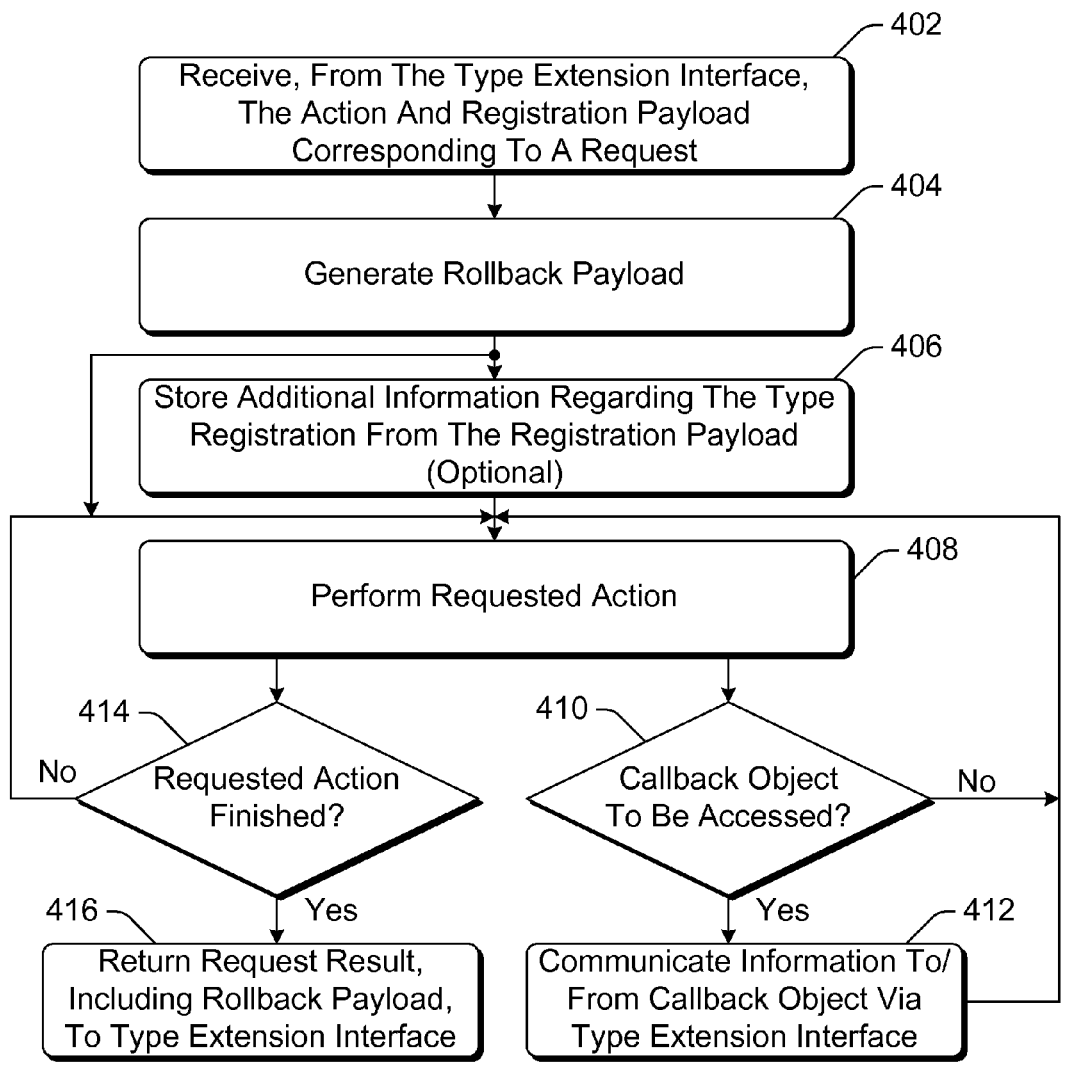
FIG. 4 is a flowchart illustrating an example process for the operation of a type extension in accordance with one or more embodiments.

FIG. 4 is a flowchart illustrating an example process 400 for the operation of a type extension in accordance with one or more embodiments. Process 400 is carried out by a type extension of a device, such as type extension 104 of FIG. 1, and can be implemented in software, firmware, hardware, or combinations thereof. Process 400 is an example process for the operation of a type extension on a device; additional discussions of the operation of a type extension on a device are included herein with reference to different figures.

In process 400, an action and a registration payload are received from a type extension interface (act 402). The registration payload was received via the client application invoking an application programming method of the type extension interface as discussed above. The action is also received from the type extension interface in act 402, whether being explicitly identified or being inherent in the method of the type extension that is invoked for receipt of the registration payload in act 402.

A rollback payload is generated (act 404). As discussed above, this rollback payload identifies a state of at least part of a store corresponding to the type extension prior at the time of receipt of the request in act 402, or at least prior to any changes made to the store in response to the request received in act 402. Also as discussed above, this rollback payload can optionally include only valid states of at least part of the store. The determination of what is a valid state can be determined by the type extension carrying out process 400, and can vary based on the type extension and the particular type registration as discussed above.

Additional information regarding the type registration from the registration payload is optionally stored (act 406). This additional information can be stored in a variety of different stores, as discussed above. This additional information can take a variety of different forms, such as an identifier of a client application, an identifier of an application being installed by the client application, a date and/or time of receipt (or of adding to the store) of a new type registration, and so forth, and can be used in a variety of different manners as discussed above.

The requested action received in act 402 is also performed (act 408). The action is performed based at least in part on the store associated with the type extension, such as adding a new type registration, removing a type registration, and so forth as discussed above.

It should be noted that, in one or more embodiments as part of performing the requested action in act 408, previously stored additional information regarding previous type registrations can be used as discussed above. For example, if the requested action is an uninstall action, then the additional information can be accessed in act 408 to determine a previous type registration that is to be added to the store to take the place of the type registration being removed from the store.

A check is then made as to whether a callback object is to be accessed (act 410). A callback object can be accessed, as discussed above, to provide information to (and/or receive information from) the client application from which the type extension interface received the request. A determination can be made that a callback object is to be accessed if new information is available to be communicated to the client application, if a check is to be made whether the process being performed by the client application has been canceled, and so forth.

If the callback object is not to be accessed, then process 400 continues to perform the requested action until finished (act 414), and continues to check whether the callback object is to be accessed (act 410). However, if the callback object is to be accessed, then the desired information is communicated to and/or obtained from the callback object via the type extension interface (act 412), and returns to act 408 to continue to perform the action.

Process 400 continues to perform the requested action until finished (act 414), also allowing the callback object to be accessed again (act 410). When the requested action is finished, the result of the request is returned to the type extension interface (act 416). The rollback payload generated in act 404 is also returned along with the result in act 416. Alternatively, the rollback payload can be returned prior to, or subsequent to, the result of the request being returned. The result and the rollback payload can subsequently be returned to the client application by the type extension interface.

Figure 5:
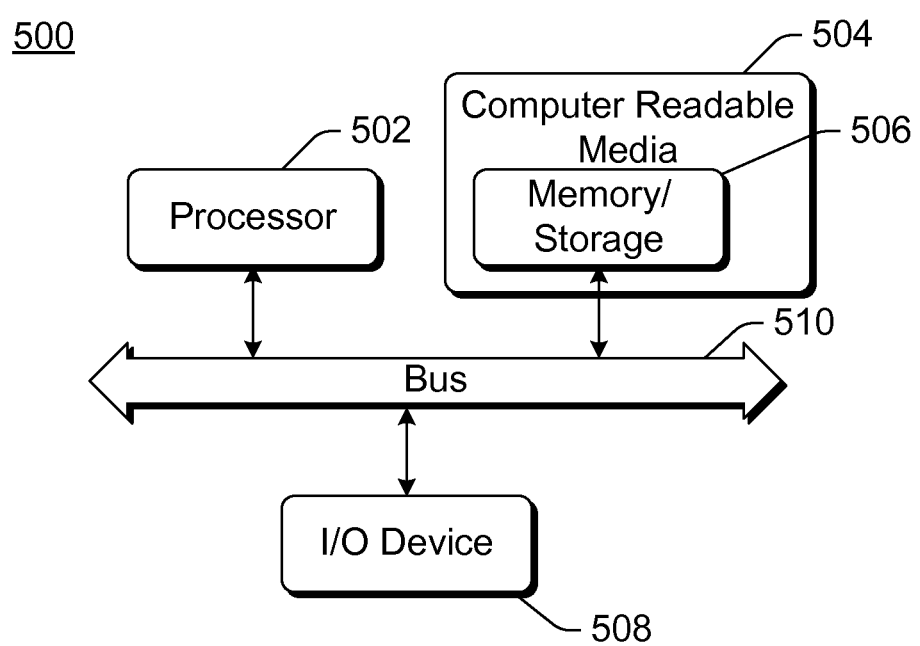
FIG. 5 illustrates an example computing device that can be configured to implement the client application independent extensibility model in accordance with one or more embodiments.

FIG. 5 illustrates an example computing device 500 that can be configured to implement the client application independent extensibility model in accordance with one or more embodiments. Computing device 500 can be, for example, computing device 100 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the client application independent extensibility model techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising
one or more processors; and
one or more computer readable media having stored thereon multiple instructions that, when executed by one or more processors, cause the one or more processors to:
receive, as one or more parameters of an application programming interface method invoked by a client application, information describing a type registration regarding which an action is being requested by the client application, the type registration describing a particular extension of the functionality of an operating system, the one or more parameters including a type extension identifier that identifies one of multiple type extensions to which the action being requested corresponds, the one or more parameters further including a registration payload that includes the type registration or an identifier of the type registration, the one of the multiple type extensions configured to receive at least one of the one or more parameters;

determine, based on the type extension identifier, that the identified one of the multiple type extensions is the one of the multiple type extensions to which the action being requested corresponds; and send the at least one of the one or more parameters, including the registration payload, to the one of the multiple type extensions for the one of the multiple type extensions to perform the action being requested.

2. The computing device as recited in claim 1, wherein the one or more parameters include an identifier of the action.

3. The computing device as recited in claim 1, wherein the action comprises an install action indicating that a new type registration is to be added to a store corresponding to the one of the multiple type extensions, and the information describing the type registration comprises the new type registration.

4. The computing device as recited in claim 1, wherein the action comprises an uninstall action indicating that a type registration is to be removed from a store corresponding to the one of the multiple type extensions, and the information describing the type registration comprises the type registration.

5. The computing device as recited in claim 1, wherein the action comprises a patch action indicating that a previous type registration in a store corresponding to the one of the multiple type extensions is to be replaced with a new type registration, and the information describing the type registration comprises both the previous type registration and the new type registration.

6. The computing device as recited in claim 5, wherein the patch action further indicates that the one of the multiple type extensions is to:

obtain a current state of the previous type registration;

identify one or more changes to the previous type registration by comparing the previous type registration to the current state of the previous type registration;

modify the new type registration to include the one or more changes; and save the modified new type registration in the store.

7. The computing device as recited in claim 5, wherein installation of the new type registration is identified by the previous type registration being a null type registration, and removal of the previous type registration is identified by the new type registration being the null type registration.

8. The computing device as recited in claim 1, wherein the action comprises a query registration action indicating that a current state of the type registration is to be retrieved from a store corresponding to the one of the multiple type extensions.

9. The computing device as recited in claim 1, wherein the action comprises a query version action indicating that an indication of a version of one of the multiple type extensions is to be returned.

10. The computing device as recited in claim 1, the multiple instructions further causing the one or more processors to:

receive, from the one of the multiple type extensions in response to the at least one of the one or more parameters being sent to the one of the multiple type extensions, a rollback payload that identifies a state of at least part of a store corresponding to the one of the multiple type extensions prior to performing the action being requested; and return the rollback payload to the client application to allow the client application to subsequently undo the action being requested.

11. The computing device as recited in claim 1, the multiple instructions further causing the one or more processors to allow the one of the multiple type extensions to communicate with the client application via a callback object provided by the client application.

12. The computing device as recited in claim 1, wherein the client application comprises an installer application.

13. A method implemented in a type extension running on a computing device, the method comprising:

receiving, from a type extension interface, a registration payload identifying a type registration for an action being requested by a client application, the registration payload including the type registration or an identifier of the type registration, the type extension interface having obtained the registration payload via the client application invoking an application programming interface method of the type extension interface and providing one or more parameters, the one or more parameters including the registration payload and a type extension identifier that identifies the type extension as one of multiple type extensions to which the action being requested corresponds, the type extension interface having determined to provide the registration payload to the type extension based on the type extension identifier identified by the client application, and the type registration describing a particular extension of the functionality of an operating system; and performing, based at least in part on a store associated with the type extension, the requested action.

14. A method as recited in claim 13, the performing the requested action comprising adding the type registration to the store.

15. A method as recited in claim 13, the performing the requested action comprising removing the type registration from the store.

16. A method as recited in claim 13, further comprising communicating with the client application via the type extension interface and a callback object provided by the client application.

17. A method as recited in claim 13, the type registration comprising a previous type registration, and the performing the requested action comprising:

obtaining, from the registration payload, the previous type registration and a new type registration;

obtaining, from the store, a current state of the previous type registration;

determining one or more changes to the previous type registration by comparing the previous type registration from the registration payload to the current state of the previous type registration;

modifying the new type registration to include the one or more changes; and saving the new type registration as modified in the store.

18. A method as recited in claim 17, the modifying comprising modifying a part of the new type registration only if the registration payload indicates changing the part is permitted.

19. One or more computer storage media having stored thereon multiple instructions that, when executed by one or more processors, implement a type extension interface including:
- a client interface to receive, from a client application, a request that an action corresponding to a type registration be taken, the request identifying a registration payload and a type extension identifier, the registration payload including a new type registration and a previous type registration, and the action comprising a patch action indicating that the previous type registration is to be replaced with the new type registration;
- a control module to identify, based on the type extension identifier, one of multiple type extensions to which the action being requested corresponds; and
- an extension interface to send, to the one type extension, the new type registration and the previous type registration, the one type extension being configured to obtain a current state of the previous type registration, determine one or more changes to the previous type registration by comparing the previous type registration to the current state of the previous type registration, modify the new type registration to include the one or more changes, and save the new type registration as modified in a store corresponding to the one type extension.

20. A method as recited in claim 13, further comprising:
generating a rollback payload that identifies a state of at least part of the store prior to performing the requested action; and
returning the rollback payload to the type extension interface to allow the client application to subsequently undo the requested action.

* * * * *